United States Patent [19]

Zeppenfeld et al.

[11] 4,220,538

[45] Sep. 2, 1980

[54] BATCH CENTRIFUGE WITH SCRAPER KNIFE MOUNTED ON INLET TUBE

[75] Inventors: Kurt Zeppenfeld, Munich; Klaus D. Koch, Vierkirchen, both of Fed. Rep. of Germany

[73] Assignee: Krauss-Maffei, Munich, Fed. Rep. of Germany

[21] Appl. No.: 962,154

[22] Filed: Nov. 20, 1978

[30] Foreign Application Priority Data

Jan. 25, 1978 [DE] Fed. Rep. of Germany ....... 2803130

[51] Int. Cl.[2] ....................... B01D 33/10; B01D 35/16

[52] U.S. Cl. ..................................................... 210/375

[58] Field of Search ............... 210/360 R, 360 A, 369, 210/372, 375

[56] References Cited

U.S. PATENT DOCUMENTS 3,402,823 9/1968 Gruner ................................ 210/375

FOREIGN PATENT DOCUMENTS 1074502 8/1960 Fed. Rep. of Germany .

1191300 4/1965 Fed. Rep. of Germany ........... 210/375

1209506 1/1966 Fed. Rep. of Germany .

1238852 4/1967 Fed. Rep. of Germany ........... 210/375

912353 8/1946 France .

*Primary Examiner*—Frank Sever

*Attorney, Agent, or Firm*—Karl F. Ross

[57] ABSTRACT

A centrifuge has a basket centered on and rotatable in either rotational sense about an upright basket axis. An upright and rigid support tube movable axially in the basket and pivotal between a pair of end positions carries at its lower end a fill tube from which a suspension to be filtered may be sprayed onto the inner wall of a basket. This support tube also carries at its lower end extending diametrically opposite the fill tube an arm carrying at its outer end an unloading knife. In one end position the fill tube is directed at the inner wall of the basket, so that a suspension can be sprayed on the inner walls of the basket. In the other end position the fill tube is turned away from the inner wall of the basket and the knife is juxtaposed therewith while the basket is reverse-rotated to strip off and inwardly deflect the filter cake thereon.

10 Claims, 3 Drawing Figures

BATCH CENTRIFUGE WITH SCRAPER KNIFE MOUNTED ON INLET TUBE

FIELD OF THE INVENTION

The present invention relates to a batch centrifuge. More particularly this invention concerns such a centrifuge having an inlet pipe and a scraper knife.

BACKGROUND OF THE INVENTION

A batch centrifuge is known having a normally cylindrical basket centered on and rotatable about an upright axis. A feed pipe or fill tube extends axially out of the basket and has a radially opening outlet mouth that can spray a suspension to be filtered or separated onto the foraminous wall of the basket. Once the suspension has been separated a scraper knife is juxtaposed with the rotating drum wall to remove the filter cake and deflect it into a normally radially inner outlet of the basket. In most situations the basket or drum is rotated in opposite directions during the filling and separating operation on the one hand and the scraping or peeling operation on the other. Such an arrangement is described in German Pat. No. 1,191,300.

This arrangement has the disadvantage that several different mechanisms must be provided for feeding in the suspension to be separated and to peel off the filter cake. These devices must all pass outwardly through the wall of the apparatus, and both must normally be not only axially reciprocal but at least limitedly pivotal in the housing, so that the assembly is rather expensive.

It has been suggested in German Pat. No. 1,238,852 to combine these functions somewhat. This arrangement nonetheless is still rather complex and failure-prone. The necessary drive to move the one piece of equipment out of the way while the other is moved into an operative position unnecessarily increases the complexity and the likelihood of failure of the system.

OBJECTS OF THE INVENTION

It is therefore an object of the present invention to provide an improved centrifuge.

Another object is the provision of an improved drum-type batch centrifuge which overcomes the above-given disadvantages of the prior-art systems.

SUMMARY OF THE INVENTION

These objects are attained according to the instant invention in a centrifuge of the above-described general type having a single support member movable axially in the drum and pivotal between a pair of end positions about a member axis offset from the basket axis.

The fill tube and the unloading knife are both fixed on the support for joint axial displacement and rotational pivoting therewith. The fill tube is directed generally radially outwardly relative to the basket axis at the basket in one of the end positions of the support member and the unloading knife is closely juxtaposed with the basket in the other end position, but is widely spaced from the basket in the one end position. Means is provided for pivoting the support member with the fill tube and unloading knife about the member axis between its end positions, and also for axially reciprocating it as the drum or basket is rotated.

Thus with the system according to the instant invention a relatively simple arrangement can be used both to operate the fill tube or feed pipe and to operate the unloading knife. Since both of these devices must be reciprocated during operation, a single such reciprocating drive can be provided. Similarly it is normal to pivot at least the unloading knife about an axis parallel to the basket axis, so that once again a single pivotal drive can be used for the two devices. A considerable saving in first cost and operation expense is thus realized, with a corresponding decrease in likelihood of breakdown. What is more the arrangement according to the instant invention insures that when the one device is functioning the other is swung out of the way and vice-versa, for automatic safe operation. Thus when, for instance, the scraper is freeing filter cake from the inner wall of the basket during reverse rotation of the basket, the mouth of the feed pipe is completely out of the way and is not likely to become blocked with lumps of filter cake.

This last-mentioned advantage is obtained according to the instant invention by forming the support member as a rigid tube forming a fluid path with the feed tube that itself extends horizontally and radially from this rigid tube. An arm extending generally diametrically opposite the fill tube carries at its outer end the knife, so that when the device is in an operative position adjacent the drum wall the other device will be spaced well inward.

SPECIFIC DESCRIPTION

Figure 1:
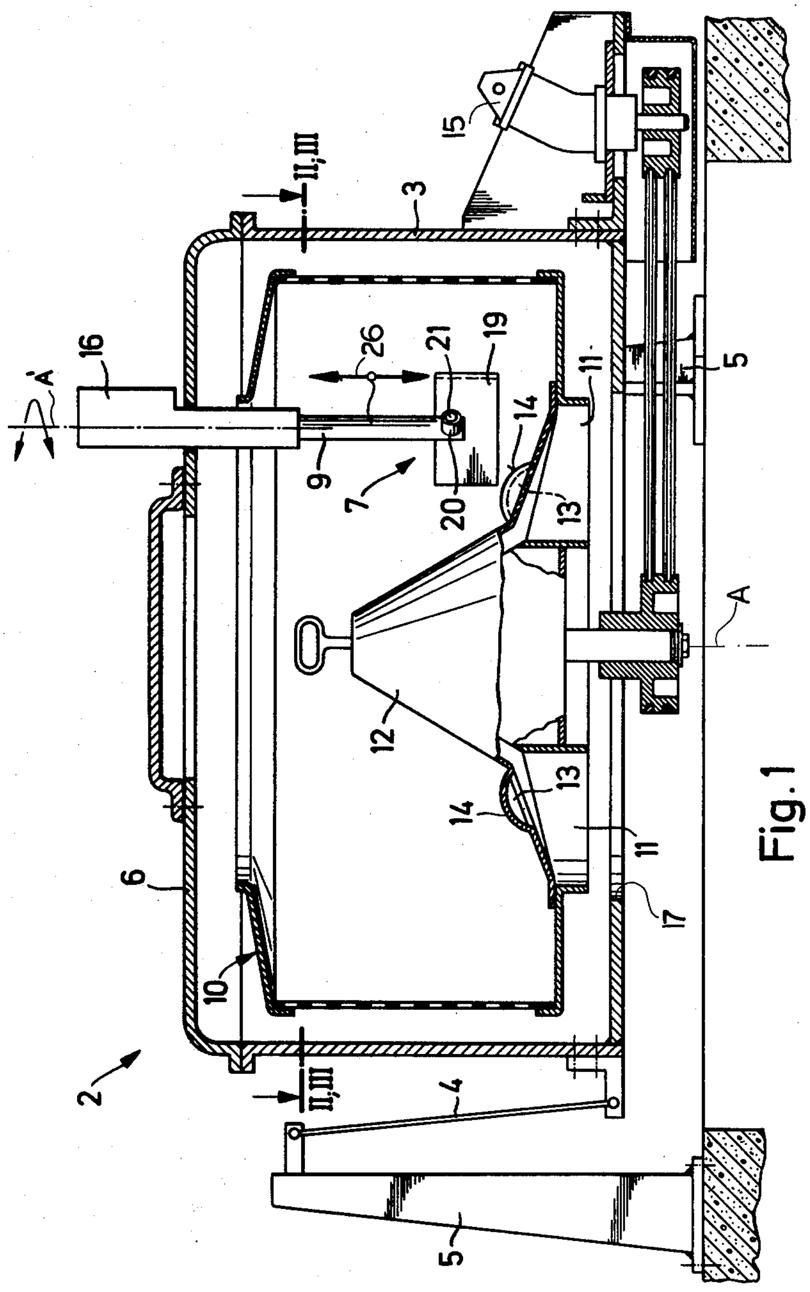
FIG. 1 is an axial section through a centrifuge according to the instant invention.

As shown in the drawing the invention comprises a link-suspended drum-type centrifuge 2 having a closed cylindrical casing 3 centered on an upright axis A and supported via three hangers or link rods 4 from three respective posts 5. The casing 3 has an openable cover 6 through which extends a combined feeding and peeling device 7 basically having a rigid upright support tube 9 centered on an axis A′ radially offset from but parallel to the axis A.

Rotatable within the casing 3 is a cylindrical foraminous basket or drum 10 centered on the axis A and formed at its bottom with an annular gap 11 across which support spokes 8 extend. An upwardly tapered cap or cover 12 overlays this gap 11 and is formed with twelve slots 13 each formed adjacent a respective scoop 14 whose function will be described below. Underneath this gap 11 the casing 3 is formed with a central hole 17. A reversible axial-piston motor 15 carried on the casing 3 is connected to the basket 10 for rotating same about the axis A.

Figure 2:
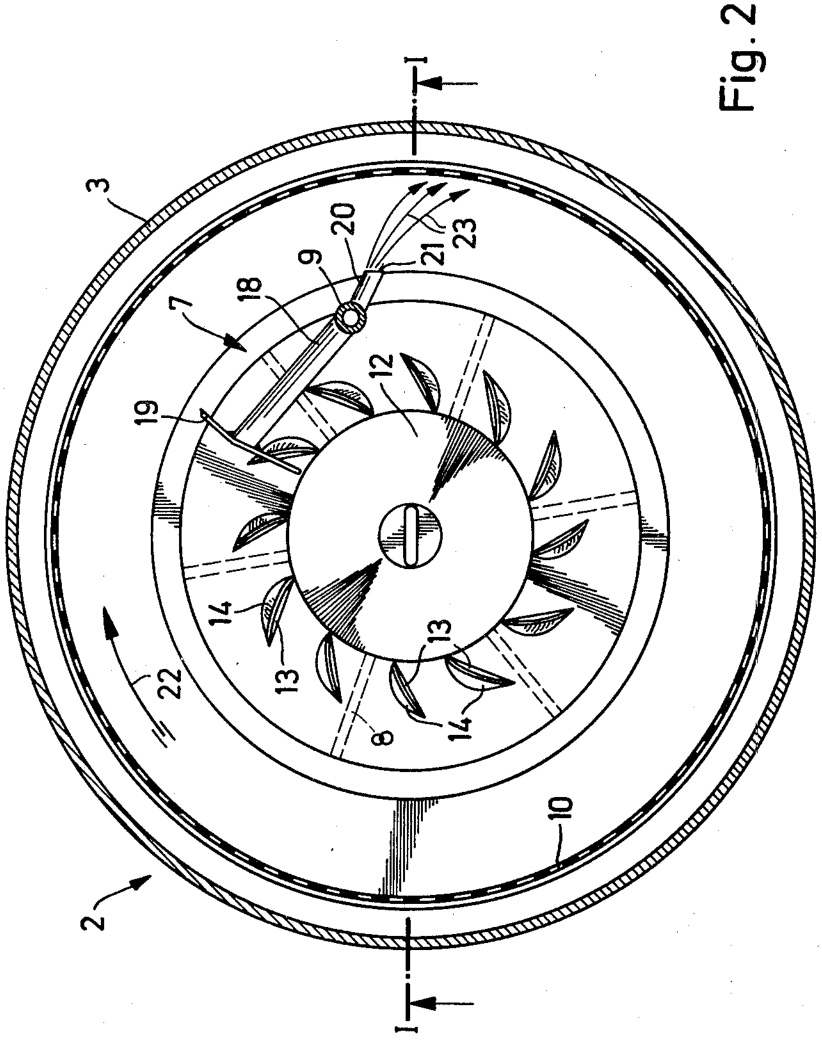
FIGS. 2 and 3 are sections taken along line II, III--II,III of FIG. 1, respectively showing the centrifuge during the filtering operation and during the peeling operation, with line I—I indicating the section plane for FIG. 1.
Figure 3:
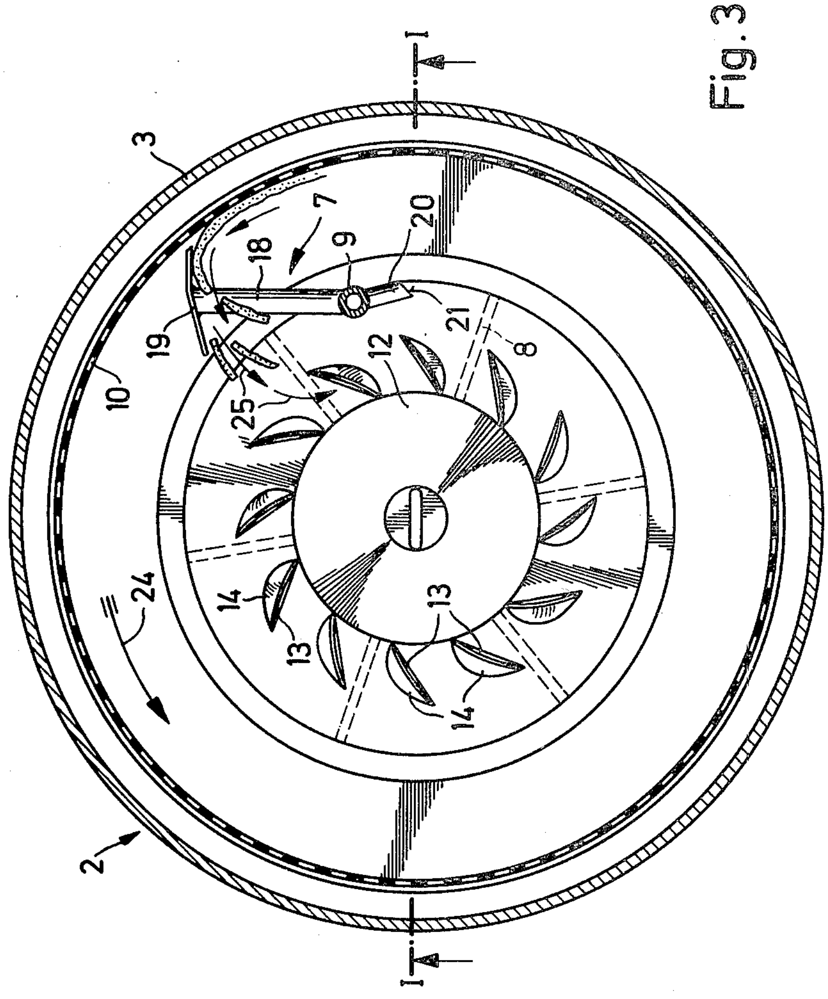

The device 7 has a drive 16 that can axially reciprocate the tube 9 and can pivot this tube 9 about the axis A′ between the two end positions shown in FIGS. 2 and 3. At its bottom end the tube 9 has a radially extending rigid arm 18 carrying on its outer end an unloading knife or scraper 19. Extending generally diametrically opposite from this arm 18 is a hollow tube or feed pipe 20 having an outlet end 21. The interior of the tube 20 communicates with the interior of tube 9 which in turn is connected to a supply for feeding a suspension to be filtered to the centrifuge tube.

In use for filtering the basket 10 is rotated about the axis A in direction 22 and the drive 16 positions the device 7 so that the tube 20 points in direction 23 radially of the axis A' and somewhat backwardly in the rotation direction 22. At the same time the drive 16 vertically reciprocates the entire unit 7 as indicated by double-headed arrow 26 so that the suspension being sprayed out the lower outlet end 21 of the fill tube 20 will engage all portions of the inner wall of the basket 10. The motor 15 is meanwhile rotating this basket 10 at very high speed so that the liquid phase is driven out of the suspension and through the foraminous wall 10 for collection or disposal.

After a filter cake has formed at the interior of the basket 10 as shown in FIG. 3 the entire basket 10 is reverse-rotated in direction 24 and the drive 16 pivots the tube 9 through approximately 45° to bring the blade 19 into close juxtaposition with the inner surface of the basket 10 and to move the end 21 of the tube 20 away from the inner wall of the drum 10. At the same time the drive 16 vertically reciprocates the entire unit 7 so that the blade 19 scrapes or peels off the filter cake and deflects it radially inwardly as shown by arrows 25. The scoops 14 are open forwardly in the rotation direction 24 so that the filter cake deflected inwardly onto them will be caught by these scoops and will be able to pass axially down through the drum and out through the outlet 17 of the casing 3. During such operation the open mouth 21 of the inlet tube 20 lies completely out of harms way, so that the possibility of filter cake lodging in it is almost completely ruled out.

We claim:

1. A centrifuge comprising:

a support;

a basket generally centered on a basket axis and rotatable relative to said support about said basket axis;

a support member movable axially in said basket and pivotal between a pair of end positions about a member axis offset from said basket axis;

a fill tube fixed on said support member and jointly displaceable and pivotal therewith, said fill tube being directed generally radially outwardly relative to said basket axis at said basket in one of said end positions;

means for introducing a suspension to be centrifuged into said basket through said fill tube in said one end position thereof;

an unloading knife fixed on said support member and jointly displaceable and pivotal therewith, said unloading knife being closely juxtaposed with said basket in the other of said end positions and being widely spaced from said basket in said one end position; and means for pivoting said support member about said member axis between said end positions and thereby jointly pivoting said fill tube and said knife about said member axis.

2. The centrifuge defined in claim 1 wherein said knife has a scraping edge and said tube has an outlet mouth at substantially the same axial position as said scraping edge.

3. The centrifuge defined in claim 2, further comprising drive means connected to said basket for rotating same in one direction when said support member is in said one position and for rotating said basket in another opposite direction when said support member is in said other end position.

4. The centrifuge defined in claim 3 wherein said axes are generally parallel, said outlet mouth being directed backwardly into said one direction in said one end position, said knife being relative to said basket axis generally radially inward of said support member in said one position.

5. The centrifuge defined in claim 3 wherein said support member is a rigid tube lying on said member axis and forming a fluid-conducting passage with said fill tube, said fill tube extending generally radially relative to said member axis from said rigid tube.

6. The centrifuge defined in claim 5 wherein said support member includes a radially extending arm having an inner end secured to said rigid tube and an outer end carrying said knife.

7. The centrifuge defined in claim 6 wherein said arm is generally diametrically opposite said fill tube.

8. The centrifuge defined in claim 3, further comprising means for axially reciprocating said support member and said knife and tube during rotation of said basket in either of said end positions of said member.

9. The centrifuge defined in claim 3 wherein in said other end position said knife is oriented to peel off filter cake from said basket and deflect the peeled-off cake radially inwardly in said basket.

10. The centrifuge defined in claim 3 wherein said basket is foraminous and has an inner outlet mouth at said basket axis.

* * * * *